(12) United States Patent
Skilton

(10) Patent No.: US 7,243,023 B2
(45) Date of Patent: Jul. 10, 2007

(54) ENGINE BALANCING SYSTEM AND METHOD

(75) Inventor: Timothy L Skilton, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 10/929,324

(22) Filed: Aug. 30, 2004

(65) Prior Publication Data

US 2005/0065712 A1 Mar. 24, 2005

Related U.S. Application Data

(60) Provisional application No. 60/504,303, filed on Sep. 19, 2003.

(51) Int. Cl.
*G01H 11/00* (2006.01)
*G06F 19/00* (2006.01)

(52) U.S. Cl. .......................... 701/124; 701/10; 701/38; 701/100; 700/279; 318/128

(58) Field of Classification Search ................ 701/124, 701/37, 38, 3, 4, 8, 10, 100; 248/559; 264/9; 700/279; 318/128; 310/51
See application file for complete search history.

(56) References Cited

U.S. PATENT DOCUMENTS 4,098,127 A 7/1978 Shiga et al.
5,214,585 A 5/1993 Ehrich
2002/0060268 A1* 5/2002 Smith et al. .................. 244/54
2006/0151272 A1* 7/2006 Smith et al. ................ 188/378

* cited by examiner

*Primary Examiner*—Tan Q. Nguyen
(74) *Attorney, Agent, or Firm*—Harness, Dickey & Pierce, P.L.C.

(57) ABSTRACT

A method for balancing vibrations in a rotating machine is provided. The rotating machine has a first and a second plane of imbalance. The method includes determining a first set of solution mass vectors that includes a first solution mass vector for the first plane and a first solution mass vector for the second plane. Each first solution mass vector includes a mass and a phase angle. A first phase difference between a phase angle of the first solution mass vector for the first plane and a phase angle for the first solution mass vector for the second plane is calculated. The first phase difference is compared to a pre-selected value. If the first phase difference is less than the pre-selected value, the first set of solution mass vectors is retained. The first set of solution mass vectors is then incremented to create a second set of solution mass vectors that includes a second solution mass vector for the first plane and a second solution mass vector for the second plane. A second phase difference between a phase angle of the second solution mass vector for the first plane and a phase angle for the second solution mass vector for the second plane is then compared to the pre-selected value. If the second phase difference is less than the pre-selected value, the second set of solution mass vectors is retained. Finally, selected retained solution mass vectors are determined that balance the rotating machine such that vibration of the rotating machine is reduced.

25 Claims, 4 Drawing Sheets

ENGINE BALANCING SYSTEM AND METHOD

CROSS REFERENCE TO RELATED APPLICATIONS

This application claims the benefit of U.S. Provisional Application No. 60/504,303, filed on Sep. 19, 2003. The disclosure of the above application is incorporated herein by reference.

FIELD OF THE INVENTION

The present invention relates to vibration balancing of rotating machinery, and more particularly to dynamic vibration balancing of turbojet engines.

BACKGROUND OF THE INVENTION

Aircraft employing turbo-machines enjoy higher performance than similar aircraft not equipped with turbo-machinery. For instance, turbojets provide significantly higher thrust at higher speeds and altitudes than the prior art engines. Modern turbojets include a compressor disc mounted on a shaft toward the forward end of the jet engine. The shaft also carries a turbine disc mounted on the aft end of the shaft. In operation, the compressor compresses rarified air drawn into the engine. Then, within a fuel mixing region of the engine, fuel nozzles inject fuel into the compressed air whereupon an igniter causes the air/fuel mixture to burn.

The now hot, and compressed, combustion gases flow through the turbine thereby forcibly turning the turbine and the shaft. In turn, the shaft turns the compressor thereby compressing more air. The partially expanded exhaust gases then escape via a converging exit nozzle to propel the aircraft forward. Because of the higher pressures and temperatures achieved via the compression of the air, the turbojet enjoys higher thrust than an engine without the turbine/compressor combination.

Many other turbo-machines enjoy similar advantages for similar reasons. However, turbo-machines are prone to vibration from the rotating parts (e.g. the compressor and turbine discs of a turbojet). The vibration arises because often the center of mass of each disc rotating assembly may be slightly displaced from the center of rotation. Moreover, the shaft may also suffer from slight misalignment and center of mass offsets too.

Thus, when the turbo-machine rotates, these imbalances cause the individual components (the compressor, the turbine, and the shaft) to vibrate. Differences between the levels of vibration of each part may aggravate the resulting movement of the machine. The vibration is typically transmitted through the aircraft structure generating corresponding noise and vibration in the cabin of the aircraft. Such vibration and noise often cause passenger and crew discomfort. Thus, a need exists to minimize the vibration and noise within the aircraft cabin causes by such engine vibrations.

Many other types of turbo-machines, beyond the turbojet engine discussed above, can suffer from the above described drawbacks. Therefore, it should be understood that references herein to turbo-machines includes any machine in which at least two parts rotate about a common shaft. Non-limiting examples of such rotating machinery include steam turbines, gas compressors, fluid pumps, gear trains, and turbochargers. Accordingly, a need exists to minimize the vibration and vibration induced movement generated by rotating machinery.

SUMMARY OF THE INVENTION

In accordance with a preferred form of the presenting invention, a method for balancing vibrations in a rotating machine is provided. The rotating machine has a first and a second plane of imbalance. The method includes determining a first set of solution mass vectors that includes a first solution mass vector for the first plane and a first solution mass vector for the second plane. Each first solution mass vector includes a mass and a phase angle. A first phase difference between a phase angle of the first solution mass vector for the first plane and a phase angle for the first solution mass vector for the second plane is calculated. The first phase difference is compared to a pre-selected value. If the first phase difference is less than the pre-selected value, the first set of solution mass vectors is retained. The first set of solution mass vectors is then incremented to create a second set of solution mass vectors that includes a second solution mass vector for the first plane and a second solution mass vector for the second plane. A second phase difference between a phase angle of the second solution mass vector for the first plane and a phase angle for the second solution mass vector for the second plane is then compared to the pre-selected value. If the second phase difference is less than the pre-selected value, the second set of solution mass vectors is retained. Finally, selected retained solution mass vectors are determined that balance the rotating machine such that vibration of the rotating machine is reduced and a preferred three-dimensional (3D) motion is achieved.

"The features, functions, and advantages can be achieved independently in various embodiments of the present inventions or may be combined in yet other embodiments."

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention provides a system and method for vibration balancing rotating machinery. More particularly, the present invention balances the vibrations at the front and rear of an aircraft jet engine to minimize aircraft interior noise and vibration caused by movement of the engine relative to the aircraft. Preferably the motion of an aircraft engine relative to the remainder of the aircraft, e.g. the aircraft fuselage, produces minimal noise and vibration within a passenger cabin of the aircraft. For example, the lowest noise and vibration for a 737NG aircraft offered by the Boeing Company of Chicago, Ill. occurs when rotation of a fan and a turbine within an engine of the aircraft are about 250 degrees out of phase. However, a preferred phase difference may vary with the speed of the engine. For other rotating machinery mounted to supporting structures (e.g. a steam turbine bolted to piers in an electricity generating facility), a preferred phase relationship between rotating components depends on the dynamic characteristics of the support structure.

Figure 1:
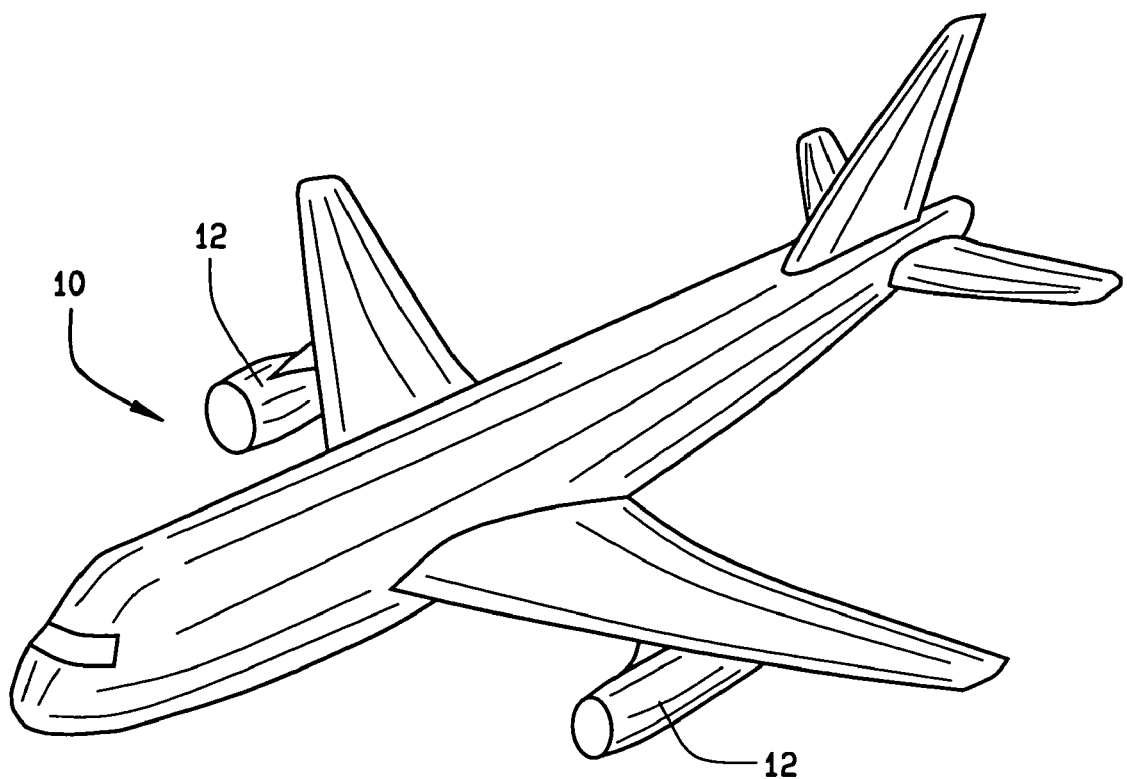
FIG. 1 is an illustration of an aircraft incorporating a turbojet engine in accordance with a preferred embodiment of the present invention.
Figure 2:
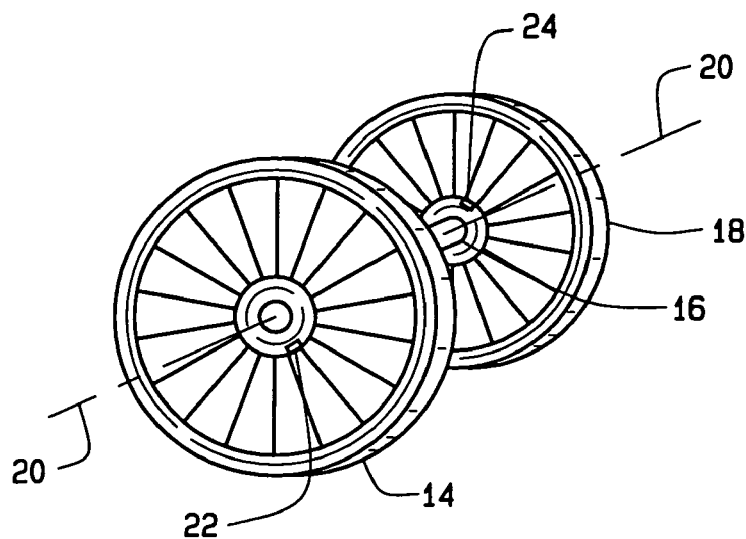
FIG. 2 is a perspective view of rotating component of the turbojet shown in FIG. 1, in accordance with a preferred embodiment of the present invention.

With reference to FIGS. 1 and 2, in accordance with a preferred embodiment of the present invention, an aircraft 10 includes one or more engines 12 which burn fuel with air to create thrust and propel the aircraft 10 through the air. The engine 12 may be a turbojet, turbofan, or any engine having rotating parts. For instance, a turbojet engine 12 includes a compressor disc 14, a shaft 16, and a turbine disc 18 where both discs 14 and 18 are rotatably mounted on the shaft 16.

Because of manufacturing and assembly tolerances, the center of mass of one or more of the rotating parts, e.g. the compressor and turbine discs 14 and 18, may not perfectly match an axis of rotation 20 of the compressor disc/shaft/turbine disc assembly. Thus, one or more attachment points 22 and 24 may be included on each rotating part, e.g. the compressor and turbine discs 14 and 18, where weights may be added to balance the part about the axis of rotation 20. Thus, the weights cause the center of mass of the rotating parts to lie along the axis of rotation 20, thereby theoretically eliminating the vibrations.

However, it has been found in practice that simply balancing the compressor disc 14 independently from the turbine disc 18 does not entirely eliminate the tendency of the engine 12 to move because of vibration induced by one or more of the discs 14 and 18. A distinction between vibration and movement may serve to better illustrate the advantages of the present invention. The term "vibration," as used herein, will generally refer to the sinusoidal motion of a part because of the mismatch between the center of mass of the part and the axis of rotation of the part. As is known to those skilled in the art, the vibration may be characterized by a level (or amplitude) and a phase angle (or direction). Thus, the vibration of a part may be represented as a vector or phasor.

The term "movement," on the other hand, refers to how the vibrations from one or more vibrating parts cause the overall machine or system to respond. For example, if the vibration of each of the components, e.g. the compressor and turbine discs 14 and 18, are in different directions (or out of phase) at any given time, the shaft 16 may tend to "rock," orbit, or move with the vibration. In turn, the movement of the shaft 20 will cause the engine 12 to tend to move relative to the aircraft 10 on which it is mounted. For instance, if the compressor disc 14 and the turbine disc 18 each independently vibrate at 1 mil (0.001 inch) in phase with one another, the vibrations would superimpose circular movement on the shaft 16 about the axis of rotation 20 in a perfect circular cylinder. This in turn would cause the engine 12 to move in a circular cylinder, which would cause vibration and noise with in the passenger cabin.

Moreover, if the compressor disc 14 and turbine disc 18 vibrations are 180 degrees out of phase with respect to each other, the engine 12 would move in such a way as to sweep out a two cones with the top of the two cones meeting in the middle, thus moving in a conical manner. In accordance with the prior art, both engines would mistakenly be viewed as identical and would be referred to as "1 mil" engines. However, in accordance with the principles of the present invention the engines would appear to be radically different.

Furthermore, each engine 12 of an aircraft will have different vibrational characteristics. Thus, the different motion of each engine 12, relative to the aircraft 10, produces correspondingly different motion of the aircraft fuselage and noise and vibration within the aircraft cabin. For example, an in phase "1 mil" engine may produce very high noise and vibration levels in the cabin. However, a 180 degree out of phase engine may produce very low vibration and noise levels in the cabin. Moreover, the in phase "1 mil" engine may cause the engine bearings to be loaded in such a way that causes the bearings to wear at an undesirably fast rate. The prior art neither recognizes the specific cause of these problems nor accurately addresses the shortcomings of presently used balancing arrangements. The present invention provides a system and method for balancing the engine 12 in such a way to produce an out of phase compressor disc 14 to turbine disc 18 relationship that results in reduced levels of cabin noise and vibration.

Figure 3:
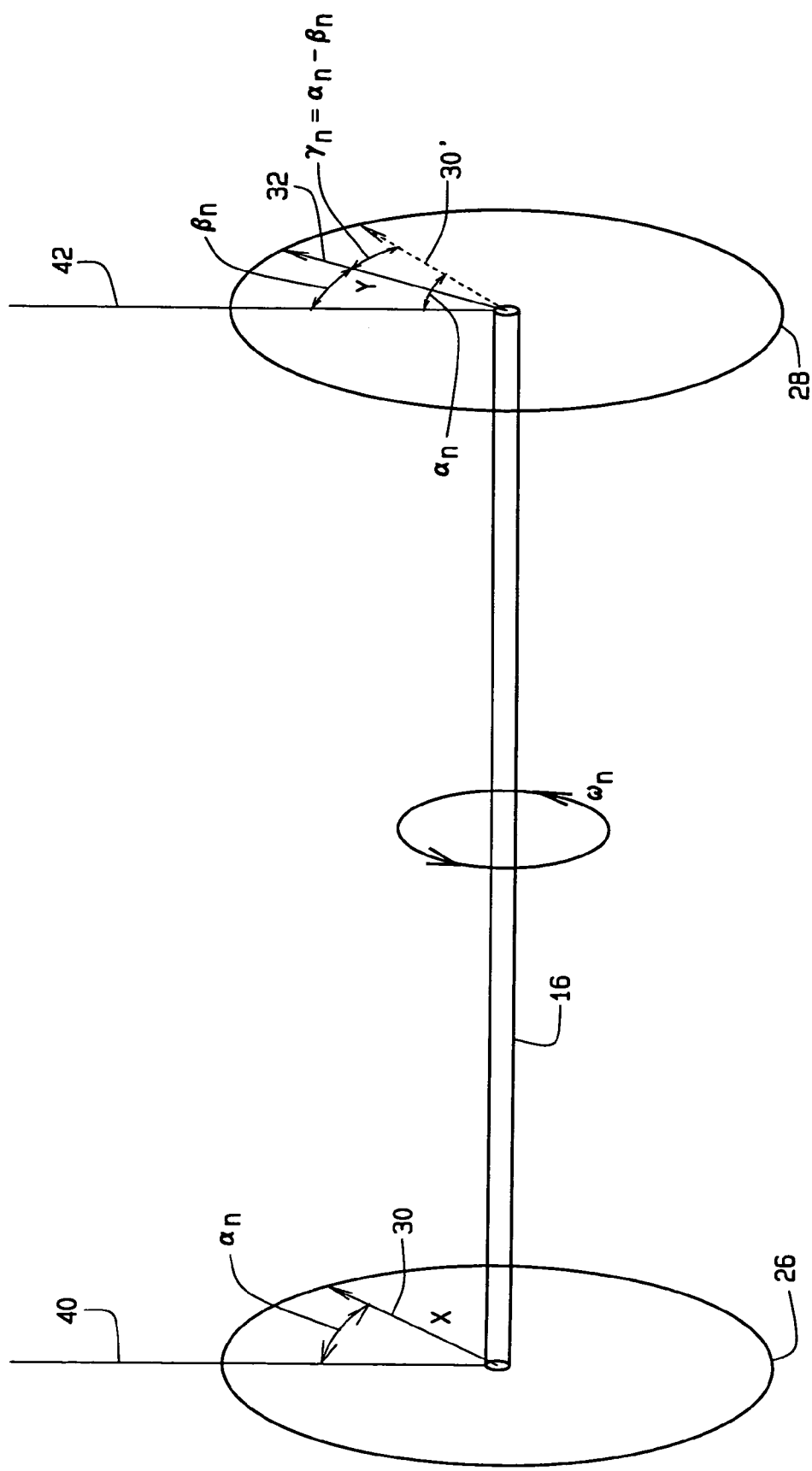
FIG. 3 is a vector diagram of vibration generated during rotation of the rotating components shown in FIG. 2.

With reference now to FIG. 3, a vector diagram of the forces exerted on the engine 12 due to vibrations of the compressor disc 14 and the turbine disc 18, is shown. The shaft 16 is shown rotating at a speed $\omega_n$ between a forward imbalance plane 26 and an aft imbalance plane 28. The aft imbalance plane 28 corresponds to the location where the turbine disc 18 is located (toward the aft end of the engine 12) and where the vibration induced by the turbine disc 18 acts on the engine 12. Here a vector 32 represents the unbalanced displacement of the turbine disc 18. Likewise, the forward imbalance plane 26 corresponds to the location where the compressor disc 14 is located (toward the forward end of the engine 12) and where the vibration induced by the compressor disc 14 acts on the engine 12. A vector 30 represents the unbalanced displacement of the compressor disc 14. Additionally, the compressor vector 30 is shown projected onto the turbine plane 28 as vector 30'.

The unbalanced displacement vector 30 has an amplitude X and a phase angle $\alpha_n$ at the rotational speed $\omega_n$. Similarly, the unbalanced displacement vector 32 has an amplitude Y and a phase angle $\beta_n$ at the rotational speed $\omega_n$. The difference between the two phase angles $\alpha_n$ and $\beta_n$ is referred to herein as a phase difference $\gamma_n$ at the rotational speed $\omega_n$. The unbalanced displacement vectors 30 and 32 can be measured using any suitable technique known in the art, for example, an influence coefficient method of balancing can be employed.

Figure 4A:
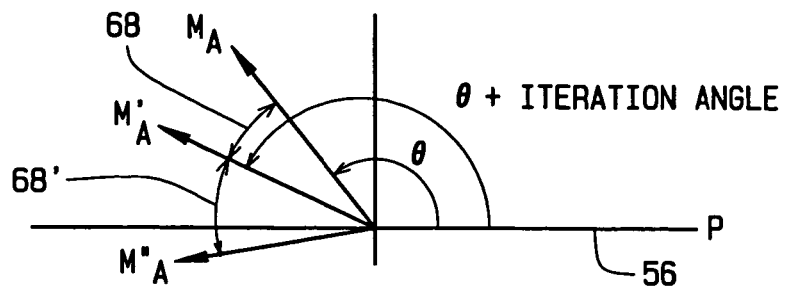
FIG. 4A is a vector diagram illustrating solution vectors for a vibration vector relating to a given mass rotated 360°, as shown in FIG. 3.
Figure 4B:
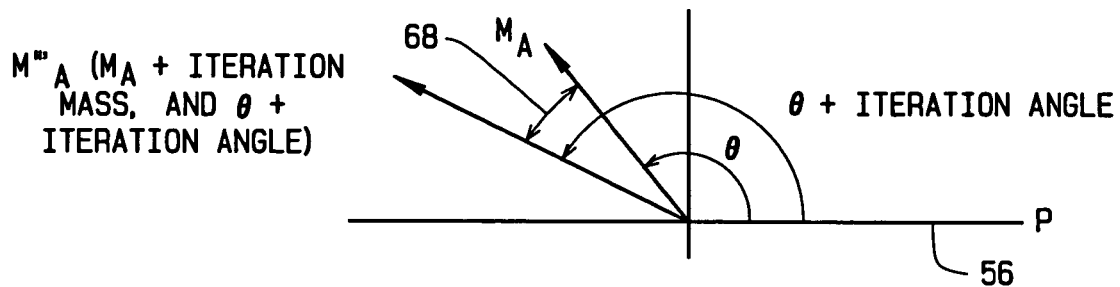
FIG. 4B is a vector diagram illustrating a change in the solution vector shown in FIG. 4A due to an increase in the given mass.

Turning now to FIGS. 4A and 4B, illustrating a preferred method of balancing the rotating parts, e.g. the compressor disc 14 and the turbine disc 18, of the engine 12. First, a solution $M_A$ is found to balance the turbine disc 18 vibration using any suitable vibration balancing technique. In a manner well known in the art, e.g. by the influence coefficient method, the solution vector $M_A$ is calculated to balance the sensed vibration with a specific mass coupled to the turbine disc 18 at a given distance from the axis of rotation 20 of the turbine disc 18 and at a specific angle θ relative to the shaft 16 angular position. Similarly, a solution is calculated to balance the sensed vibration with a specific mass coupled to the compressor disc 14 at a given distance from the axis of rotation 20 and at a specific angle. However, the compressor solution is not shown in FIG. 4A for clarity.

Then, an angle increment 68 is added to the original turbine solution $M_A$. The new turbine solution $M'_A$ (with the angle increment 68 added), and the unaltered compressor solution (not shown) are added to a mathematical model (not shown) of the engine 12. Then vibration amplitudes are calculated for the turbine disc 18 and compressor disc 14. If the calculated vibration amplitudes for either the turbine disc 18 or the compressor disc 14 exceeds a pre-selected level, then the incremented solution $M'_A$ is discarded and an additional angle increment 68' is added to the previously incremented turbine solution $M'_A$, resulting in a subsequent incremented turbine solution $M''_A$. Again, vibration levels are calculated and checked.

However, if the calculated vibration amplitudes remain below the pre-selected level, then the current, incremented solution, e.g. the incremented solution $M'_A$, is checked to see if the predicted phase difference between the turbine disc 18 and compressor disc 14 vibrations approximately equals a pre-selected amount, i.e. the phase difference is within a pre-selected range. If not, then that solution $M'_A$ is discarded and the subsequent incremented solution $M''_A$ is calculated If the phase difference is acceptable then the solution $M'_A$ is retained for further consideration.

The incremental additions to the turbine solution continue until the incremented turbine solution has been rotated, via incremental additions to the angle of the original solution as described above, through 360 degrees. At that time, incremental angle additions begin on the compressor solution until it too has been rotated through 360 degrees. With each increment, the amplitude and phase difference checks are made, as described above. Next, another set of iterations are run in which the mass of the turbine solution $M_A$ is incremented until it exceeds a pre-determined limit. For instance, an incremented turbine solution $M'''_A$ is shown in FIG. 4B with one angle increment 68 added to it and an incremental addition to its mass equal to the difference in amplitude between the vectors $M_A$ and $M'''_A$).

Again, the vibration amplitudes and phase angles are calculated for each iteration of the individual solutions. If a particular iteration causes unacceptable vibration levels or phase differences it is discarded. The acceptable solutions are of course retained for further consideration. Another set of iterations are then performed in which the mass of the compressor solution is incremented with similar calculations and checks made. It should be understood that although, as described above, the masses are incremented to generate possible solutions, the masses may also be decremented. Moreover, in a preferred embodiment one or more masses may be set to zero. That is, a solution may be considered in which the number of weights attached to the rotating components is less than the number of rotating components. Additionally, the iterations may be repeated at various engine 12 rotational speeds of interest. For example, the iterations may be repeated for speeds at which the engine 12 is prone to producing noise, vibration, or motion or at which the engine is operated frequently.

After all iterations are performed, the engine 12 has been analyzed across a five dimensional spectrum of potential solutions, where the five dimensions correspond to the first solution angle, the first solution mass, the second solution angle, the second solution mass, and engine speed. Of course, any one of these dimensions may, or may not, be iterated as circumstances may suggest, e.g. if a component must remain optimized for other reasons the iterations of the corresponding solution may be omitted. Likewise, the order of the iterations is immaterial since similar solution sets will be generated regardless of the order of iteration.

The retained result of the sets of iterations, i.e. the turbine phase angle, turbine weight, compressor angle, compressor weight, and speed, includes a series of possible solutions which can be used in balancing the engine 12 as a whole. In contrast, the prior art systems would have balanced the turbine disc 18 and compressor disc 14 independently using the original, un-incremented solutions. In a preferred alternate embodiment, the present invention includes a solution in which a weight is added to the fan of a turbojet only, thereby providing a one plane solution for a two plane imbalance.

Next, the retained solutions are examined to determine which solution, i.e. a particular combination of turbine solution phase angle, turbine solution mass, compressor solution angle, and compressor solution mass, would best balance the engine 12 as determined by engine motion, rather than turbine disc 18 and compressor disc 14 vibration levels only. Notably, the phase difference predicted for each solution is a criterion by which the best overall solution for the engine 12 may be chosen. Another additional criterion which may be used in selecting the best solution is a root mean squared evaluation of the amplitudes, over all applicable speed ranges, which produces the least movement of the engine over the range. Because the preferred phase difference may differ at different speeds of the engine 12 (or rotating machine) yet another criterion which may be used is the speed for which the engine 12 should be balanced.

Then based on the selected solution, appropriate weights are installed at the appropriate angles and distances on the turbine disc 18 and/or compressor disc 14. The engine 12 may then be operated and the predicted vibration levels and motion verified. An engine 12 balanced of the principles of the present invention thus enjoys vastly reduced motion as well as reduced vibration levels. Those skilled in the art will recognize that an engine balanced in accordance with the present invention may indeed vibrate or move. That result occurs because rather than minimizing vibration (in the conventional sense), the present invention optimizes the vibration to produce a desired motion. Accordingly, transmitted cabin noise and vibration levels decrease along with (cyclical) stress in the support structures. Thus, the present invention provides an aircraft 10 which operates more quietly and which is subject to less fatigue. Therefore, sound insulation and structural weight may be reduced.

Figure 5:
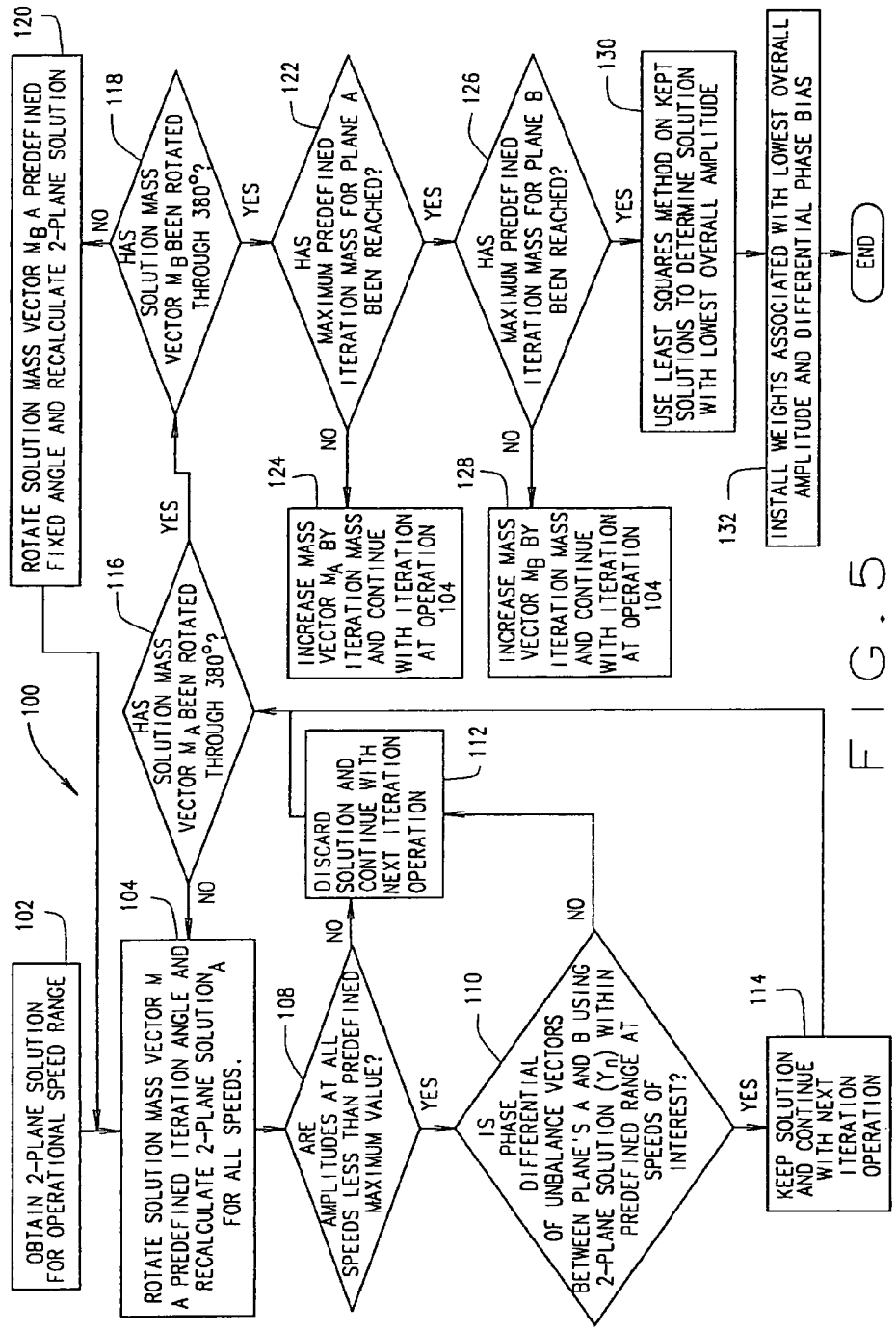
FIG. 5 is a flow chart further illustrating a method of balancing the rotating parts of the engine shown in FIG. 1, in accordance with a preferred embodiment of the present invention.

FIG. 5 is a flow chart further illustrating the method of balancing the rotating parts, e.g. the compressor disc 14 and the turbine disc 18, of the engine 12 in accordance with a preferred embodiment of the present invention. First, as described above, the plane solutions are obtained for each of the rotating components (or balance planes), as indicated at 102. As indicated at 104, the angle of one of the solution mass vectors is then incremented by a pre-selected amount and, based on the newly incremented mass vector and the unaltered mass vectors, the vibration response of the rotating components and the movement of the machine as a whole are calculated.

The resulting response is then compared to pre-selected criteria for vibration levels, phase differences, and machine motion, as indicated at 108 and 110. If the pre-selected criteria are not met, the set of mass vectors (one for each of the rotating components including the one which was incremented) is discarded, as indicated at 112. Otherwise, the set of mass vectors is retained for further consideration, as indicated at 114.

Regardless of whether the current set of mass vectors is retained, a determination is made as to whether the set just analyzed has been rotated through 360 degrees, as indicated at 116. If not, the incremental additions to the angle continue, as previously indicated at 104. Otherwise, the mass vector associated with another component is selected and its angle incremented until it too is rotated through 360 degrees, as indicated at 118 and 120.

Once every mass vector has been rotated through 360 degrees and the predicted vibration responses calculated, an iteration of the mass of the first mass vector (as originally calculated prior to the iteration of its angle) begins, as indicated at 122 and 124. Again the predicted vibration responses are checked to determine if they are acceptable and retained or discarded accordingly. Then each remaining mass vector of the original solution is also iterated with respect to mass, as indicated at 126 and 128.

After all of the iterations, for all mass vector angles, masses, and all engine speeds, are complete, the best set of mass vectors is chosen, for instance by the method of least squares with respect to the motion of the machine, as indicated at 130. Finally, the weights defined by the best solution are placed on the rotating components at the angles defined, as indicated at 132.

Figure 6:
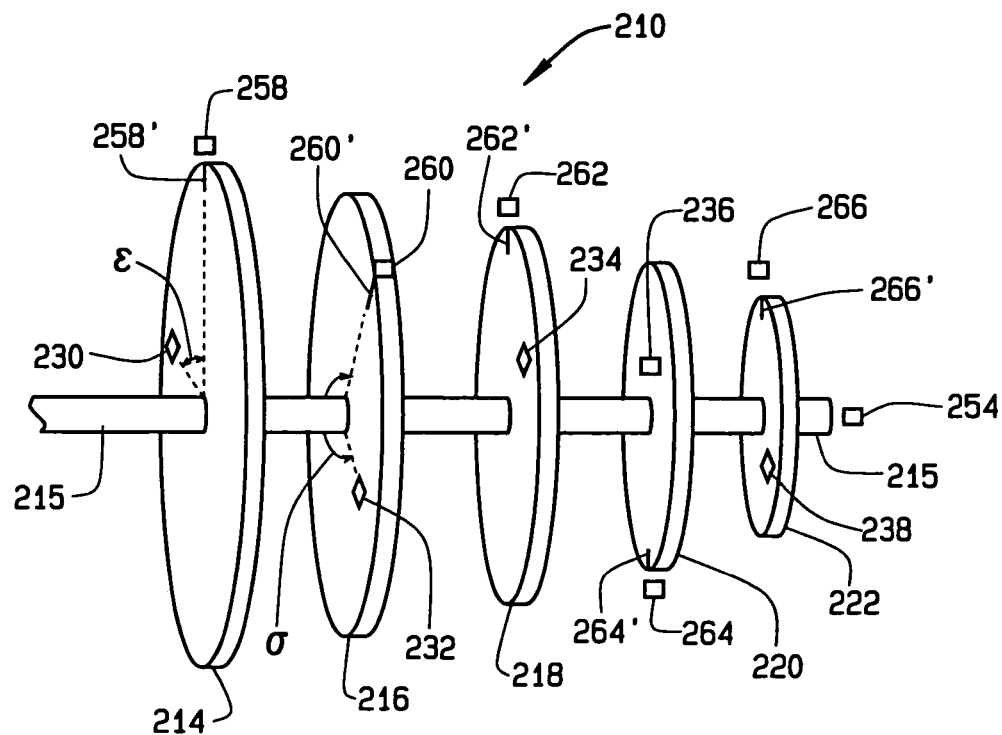
FIG. 6 is a perspective view of a rotating machine balanced in accordance with the principles of the present invention.

With reference now to FIG. 6, yet another preferred method is illustrated for balancing a machine 210 having a plurality of rotating components 214 to 222. For each rotating component a transducer (transducers 258 to 266) is installed to detect the vibration of the component. Also, a shaft position sensor 254 (along with an aid such as optical tape or a keyway) may be used to determine the angular position of the shaft 215. Generally speaking, each rotating component (214 to 222) will rotate and vibrate within a particular imbalance plane.

The method begins with the rotating machine 210 at rest. Then the rotor 215, or shaft, is turned until the shaft angular position sensor 254 defines a reference angular position of the rotor 215 against which other angles will be measured. The rotor 215 is then marked with a 258' under transducer 258 to indicate a reference angle. Reference angles for each of the rotating components 214 to 222 are similarly marked with marks 260' to 266'.

With the machine running at a pre-selected speed (preferably not a critical speed), the vibration vectors for each of the rotating components 214 to 222 are measured with the vibration transducers 258 to 266 respectively. The vibration vectors each include an amplitude and phase lag measured from the respective marks 258' to 266' on the corresponding components 214 to 222, wherein positive angles are measured opposite to the direction of rotor 215 rotation.

Next, the rotor 215 is stopped and a trial mass 230 is added to the component 214 at a measured angle ϵ from the mark 258'. The rotor 215 is then turned at the previously selected speed and measurements are made of the new vibration vectors for each rotating component 214 to 222. Then the rotor 215 is brought to rest and the trial mass 230 is removed from component 214.

A second trial mass 232 is then added to the component 216 at a measured angle a from the mark 260'. Again the new vibration vectors for components 214 to 222 are measured at the pre-selected speed. Then a new set of measured vibration vectors (those with the trial mass 232 installed) are used to calculate another set of balance mass vectors for each of the components 214 to 222. The process of adding trial masses 234, 236, and 238, and calculating vibration vectors for each component 214 to 222 is repeated for the remaining rotating components 218, 220, and 222 one at a time. With the mass and placement of the trial masses 230 to 238 known, the corresponding balance mass vectors are calculated.

Then, for all speeds at which balancing is desired, the previous steps of attaching trial weight and measuring new vibration vectors for each of the components 214 to 222, and calculating corresponding balance mass vectors are repeated. The balance mass vector which produces the lowest overall vibration amplitude for all speeds is then selected, for example using a least squares method.

Each balance mass vector may then be iterated with respect to its lag angle through 360 degrees and with respect to its mass until a pre-selected limit is reached. Note that the iteration of the mass may also involve decrementing the mass, even to zero mass. The resulting incrementally changed mass vectors may then be added (mathematically) to a model of the rotating machine 210 and the vibration responses calculated therefrom. The calculated vibration responses are then compared to pre-selected amplitude, phase difference, and motion levels.

The sets of iterated mass balance vectors (including one vector corresponding to each component 214 to 222) with unacceptable calculated vibration amplitudes, phase differences, or motions are then discarded. Meanwhile, the sets of iterated mass balance vectors with acceptable vibration amplitudes, phase differences, and motions are of course retained for further consideration. Then, the set of iterated mass balance vectors which best balances the rotating machine 210 as a whole may be chosen from the retained sets. For instance, the least squares method may be used to select the set which will be used to balance the machine 210 over its operational speed range or over those speeds at which it is desired to minimize vibration or machine motion.

As those skilled in the art will appreciate, the present invention provides a superior method of balancing rotating machines. By considering a phase difference in balancing the engine the unexpected result of controlling the engine motion may be achieved. Accordingly, generated and transmitted noise decrease substantially. Wear on the machine parts may be reduced and better controlled. Moreover, the support structure may be reduced in weight.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for balancing vibrations in a rotating machine having a first and a second plane of imbalance, the method comprising:

determining a first set of solution mass vectors that includes a first solution mass vector for the first plane and a first solution mass vector for the second plane, each first solution mass vector includes a mass and a phase angle;

determining whether a first phase difference between a phase angle of the first solution mass vector for the first plane and a phase angle for the first solution mass vector for the second plane is less than a pre-selected amount;

retaining the first set of solution mass vectors if the first phase difference is less than the pre-selected amount;

incrementing the first set of solution mass vectors to create a second set of solution mass vectors that includes a second solution mass vector for the first plane and a second solution mass vector for the second plane;

determining whether a second phase difference between a phase angle of the second solution mass vector for the first plane and a phase angle for the second solution mass vector for the second plane is less than the pre-selected amount;

retaining the second set of solution mass vectors if the second phase difference is less than the pre-selected amount, and determining selected ones of the retained solution mass vectors that balance the rotating machine such that vibration of the rotating machine is reduced.

2. The method of claim 1, wherein the rotating machine comprises a jet engine.

3. The method of claim 1, wherein incrementing the first set of solution mass vectors comprises at least one of:
incrementing an angle of the first solution mass vector for the first plane;
incrementing an amplitude of the first solution mass vector for the first plane; and
incrementing a rotational speed of the machine.

4. The method of claim 1, wherein incrementing the first set of solution mass vectors comprises at least one of:
incrementing an angle of the first solution mass vector for the second plane;
incrementing an amplitude of the first solution mass vector for the second plan; and
incrementing a rotational speed of the machine.

5. The method of claim 1, wherein determining selected ones of the retained solution mass vectors that balances the rotating machine comprises calculating a least squares result of the retained solution mass vectors and retaining the least squares result as a set of solution mass vectors.

6. The method of claim 1, wherein determining selected ones of the retained solution mass vectors that balances the rotating machine comprises performing an influence coefficient calculation.

7. The method of claim 1, wherein incrementing the first solution mass vector for the first plane comprises negatively incrementing the mass of the first solution mass vector for the first plane.

8. The method of claim 7, wherein negatively incrementing the mass of the first solution mass vector for the first plane comprises setting the mass of the first solution mass vector for the first plane substantially equal to zero.

9. The method of claim 1, wherein determining selected ones of the retained solution mass vectors that balances the rotating machine comprises determining the selected ones of the retained solution mass vectors based on a speed at which the machine to operate.

10. A vibration analyzer for analyzing vibrations of a rotating machine having a shaft and a first and a second plane of imbalance substantially perpendicular to the shaft, the analyzer comprising:
a circuit adapted to
accept a shaft datum signal, a first vibration signal and a second vibration signal;
determine a first set of solution mass vectors based on the shaft datum signal, the first vibration signal and the second vibration signal, the first set of solution mass vectors including a first solution mass vector for the first plane and a first solution mass vector for the second plane, each first solution mass vector includes a mass and a phase angle;
determine whether a first phase difference between a phase angle of the first solution mass vector for the first plane and a phase angle for the first solution mass vector for the second plane is less than a pre-selected amount;
retain the first set of solution mass vectors if the first phase difference is less than the pre-selected amount;
increment the first set of solution mass vectors to create a second set of solution mass vectors that includes a second solution mass vector for the first plane and a second solution mass vector for the second plane;
determine whether a second phase difference between a phase angle of the second solution mass vector for the first plane and a phase angle for the second solution mass vector for the second plane is less than the pre-selected amount;
retain the second set of solution mass vectors if the second phase difference is less than the pre-selected amount, and
determine selected ones of the retained solution mass vectors that balance the rotating machine such that vibration of the rotating machine is reduced.

11. The analyzer of claim 10, wherein the analyzer is adapted to analyze the vibrations of a jet engine.

12. The analyzer of claim 10, wherein to increment the first set of solution mass vectors to create a second set of solution mass vectors the circuit is further adapted to increment at least one of an angle of the first solution mass vector for the first plane; an amplitude of the first solution mass vector for the first plane; and a rotational speed of the machine.

13. The analyzer of claim 10, wherein to increment the first set of solution mass vectors to create a second set of solution mass vectors the circuit is further adapted to increment at least one of an angle of the first solution mass vector for the second plane; an amplitude of the first solution mass vector for the second plane; and a rotational speed of the machine.

14. The analyzer of claim 10, wherein to determine the first set of solution mass vectors circuit is further adapted to perform an influence coefficient calculation utilizing the first vibration signal and the second vibration signal.

15. The analyzer of claim 10, wherein to increment the first solution mass vector for the first plane the circuit is further adapted to negatively increment the mass of the first solution mass vector for the first plane.

16. The analyzer of claim 15, wherein to negatively increment the mass of the first solution mass vector, the circuit is further adapted to decrement the mass of the first solution mass vector for the first plane to zero.

17. The analyzer of claim 10, wherein to determine the selected ones of the retained solution mass vectors that balances the rotating machine, the circuit is further adapted make the determination based on a desired operational speed of the machine.

18. The analyzer of claim 10, wherein to determine the selected ones of the retained solution mass vectors that balances the rotating machine, the circuit is further adapted to calculate a least squares result of the retained solution mass vectors and retaining the least squares result as a set of solution mass vectors.

19. A method for balancing vibrations in a rotating machine including a first rotational component and a second rotational component, the first and second rotational components respectively generating a first plane of rotational imbalance (PORI) and a second plane of rotational imbalance (PORI) during operation of the rotating machine, said method comprising;
- a) measuring a first vibration vector for the first PORI and a first vibration vector for the second PORI with the rotating machine operating at a first rotational speed;
- b) measuring a second vibration vector for the first PORI and a second vibration vector for the second PORI with a specified mass attached to the first rotational component and the rotating machine operating at the first rotational speed;
- c) measuring a third vibration vector for the first PORI and a third vibration vector for the second PORI with a specified mass attached to the second rotational component and the rotating machine operating at the first rotational speed;
- d) calculating a first balance mass vector for the first PORI utilizing the first, second and third vibration vectors for the first PORI, and a first balance mass vector for the second PORI utilizing the first, second and third vibration vectors for the second PORI;
- e) calculating at least one subsequent balance mass vector for the first PORI and at least one subsequent balance mass vector for the second PORI by repeating 'a' through 'd' with the rotating machine operating at at least one subsequent rotational speed;
- f) calculating a first resulting vibration vector for each of the first balance mass vectors and the subsequent balance mass vectors;
- g) incrementing each of the first balance mass vectors and the subsequent balance mass vectors and calculating subsequent resulting vibration vectors for each incremented first balance mass vector and each incremented subsequent balance mass vector;
- h) comparing each of the first resulting vibration vector and each of the subsequent resulting vibration vectors to at least one resulting vibration vector value threshold;
- i) retaining each of the first resulting vibration vector and each of the subsequent resulting vibration vectors that do not exceed the resulting vibration vector threshold; and
- j) determining selected ones of the retained resulting vibration vectors that balance the rotating machine such that vibration of the rotating machine is reduced.

20. The method of claim 19, wherein incrementing each of the first balance mass vectors and the subsequent balance mass vectors comprises:

rotating each of the first balance mass vectors and the subsequent balance mass vectors a specific angular increment and calculating the subsequent resulting vibration vectors for each incremented first balance mass vector and each incremented subsequent balance mass vector;

repeating the incrementally rotating and calculating the subsequent resulting vibration vectors until each of the first balance mass vectors and the subsequent balance mass vectors are incrementally rotated through 360°.

21. The method of claim 19, wherein incrementing each of the first balance mass vectors and the subsequent balance mass vectors comprises:

incrementally increasing an amplitude of first balance mass vectors and the subsequent balance mass vectors and calculating the subsequent resulting vibration vectors for each incremented first balance mass vector and each incremented subsequent balance mass vector;

repeating the incrementally increasing and calculating the subsequent resulting vibration vectors until the amplitude of each of the first balance mass vectors and the subsequent balance mass vectors exceeds a maximum amplitude.

22. The method of claim 19, wherein the resulting vibration vector value threshold is a maximum amplitude value for any of the resulting vibration vectors.

23. The method of claim 19, wherein the vibration vector value threshold is a maximum phase differential between a phase angle of each resulting vibration vector for the first PORI and a phase angle of each related resulting vibration vector for the second PORI.

24. The method of claim 19, wherein the rotating machine is a jet engine.

25. The method of claim 19, wherein determining the selected ones of the retained resulting vibration vectors that balance the rotating machine comprises calculating a least squares result of the retained resulting vibration vectors.

* * * * *